US012579872B2

(12) United States Patent
Hashizume et al.

(10) Patent No.: US 12,579,872 B2
(45) Date of Patent: Mar. 17, 2026

(54) MOVING BODY MANAGEMENT AND CONTROL DEVICE AND TERMINAL DEVICE

(71) Applicant: NEC Corporation, Tokyo (JP)

(72) Inventors: Daisuke Hashizume, Tokyo (JP); Yumi Tanaka, Tokyo (JP); Takahiro Oba, Tokyo (JP); Mitsuyuki Kondo, Tokyo (JP); Hiroaki Yoshida, Tokyo (JP); Iwao Ishida, Tokyo (JP); Hiroyuki Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 22 days.

(21) Appl. No.: 18/708,300

(22) PCT Filed: Dec. 2, 2021

(86) PCT No.: PCT/JP2021/044216
§ 371 (c)(1),
(2) Date: May 8, 2024

(87) PCT Pub. No.: WO2023/100307
PCT Pub. Date: Jun. 8, 2023

(65) Prior Publication Data
US 2025/0014438 A1 Jan. 9, 2025

(51) Int. Cl.
*G08B 13/196* (2006.01)
*G08B 25/10* (2006.01)
(Continued)

(52) U.S. Cl.
CPC ....... *G08B 13/19602* (2013.01); *G08B 25/10* (2013.01); *G08G 5/22* (2025.01);
(Continued)

(58) Field of Classification Search
CPC .... G08B 13/19602; G08B 25/10; G08G 5/23; G08G 5/57; G08G 5/727; G08G 5/22
See application file for complete search history.

(56) References Cited

U.S. PATENT DOCUMENTS

2016/0253907 A1 9/2016 Taveira
2018/0276998 A1* 9/2018 Yu .......................... G08G 5/22
(Continued)

FOREIGN PATENT DOCUMENTS

JP 2018-534654 A 11/2018
JP 2020-191509 A 11/2020
(Continued)

OTHER PUBLICATIONS

International Search Report for PCT Application No. PCT/JP2021/044216, mailed on Mar. 8, 2022.
(Continued)

*Primary Examiner* — John A Tweel, Jr.
(74) *Attorney, Agent, or Firm* — Sughrue Mion, PLLC

(57) ABSTRACT

To enable accurate detection of a moving body that has fraudulently entered a monitored area, a moving body management device comprises: a reception unit that receives moving body identification information enabling identification of a moving body and representing the state of the moving body from an information processing terminal device that has received the moving body identification information from the moving body that has transmitted the moving body identification information; a determination unit that determines whether or not the moving body has entered an entry-prohibited area by comparing the received moving body identification information with entry permission management information representing an area that the moving body is permitted to enter or prohibited from entering; and a transmission unit that transmits a determination result obtained by the determination unit to the
(Continued)

information processing terminal device capable of displaying the determination result.

11 Claims, 9 Drawing Sheets

(51) Int. Cl.
*G08G 5/22* (2025.01)
*G08G 5/23* (2025.01)
*G08G 5/57* (2025.01)
*G08G 5/72* (2025.01)

(52) U.S. Cl.
CPC ................. *G08G 5/23* (2025.01); *G08G 5/57* (2025.01); *G08G 5/727* (2025.01)

(56) References Cited

U.S. PATENT DOCUMENTS

| | | | | |
|---|---|---|---|---|
| 2020/0174499 | A1* | 6/2020 | Motegi | G05D 1/0094 |
| 2020/0265723 | A1 | 8/2020 | Gordon et al. | |
| 2020/0372258 | A1* | 11/2020 | Kobayashi | G06V 20/52 |

FOREIGN PATENT DOCUMENTS

| | | | |
|---|---|---|---|
| WO | 2020/170332 | A1 | 8/2020 |
| WO | 2020/170966 | A1 | 8/2020 |

OTHER PUBLICATIONS

English translation of Written opinion for PCT Application No. PCT/JP2021/044216, mailed on Mar. 8, 2022.

* cited by examiner

MOVING BODY MANAGEMENT AND CONTROL DEVICE AND TERMINAL DEVICE

This application is a National Stage Entry of PCT/JP2021/044216 filed on Dec. 2, 2021, the contents of all of which are incorporated herein by reference, in their entirety.

TECHNICAL FIELD

The present invention relates to a moving body management device, an information processing terminal device, a moving body control device, a moving body management method, and a recording medium storing a moving body management program.

BACKGROUND ART

In recent years, equipment (hereinafter referred to as a moving body in the present application) that can be moved automatically, such as a drone or a robot, or operated manually has been used in various scenes. In addition, various techniques for managing the operation of such a moving body have been developed.

As a technique related to such a technique, PTL 1 discloses an unmanned flying device that flies based on instruction information acquired from an external device. This device stores a device identification (ID) for identifying the own device. The device authenticates that the instruction information is proper based on the acquired instruction information and the registered operator ID stored in the recording medium. Then, on condition that the instruction information is determined to be proper, the device flies based on the instruction information within an operable range defined by the relationship between the registered operator ID and the device ID.

CITATION LIST

Patent Literature

PTL 1: WO 2020/170332 A1

SUMMARY OF INVENTION

Technical Problem

As opportunities for using a moving body such as a drone increase, for example, the occurrence of cases in which a drone enters an important facility and images the facility also increases, and thus, detection of an illegally entered drone by a security guard or the like is being performed at the periphery of the important facility or the like. In this case, the drone flying through the peripheral area of the important facility is not necessarily a suspicious drone, and the drone permitted to enter the peripheral area may be erroneously detected as a suspicious drone. Alternatively, conversely, there is a case where a security guard erroneously recognizes a drone that is not permitted to enter the peripheral area with a drone that has been permitted to enter, thereby overlooking a suspicious drone. That is, it is a problem to accurately detect a moving body such as a drone that has illegally entered a monitoring target area. PTL 1 does not particularly mention this problem.

A main object of the present invention is to accurately detect a moving body that has illegally entered a monitoring target area.

Solution to Problem

A moving body management device according to one aspect of the present invention includes a reception means that receives moving body identification information from an information processing terminal device that has received the moving body identification information transmitted from a moving body, the moving body identification information being information with which the moving body can be identified and indicating a state of the moving body, a determination means that determines whether the moving body has entered an area where entry is prohibited by collating the received moving body identification information with entry permission management information indicating an area where entry is permitted or prohibited with respect to the moving body, and a transmission means that transmits, to the information processing terminal device, a determination result from the determination means, the information processing terminal device being capable of displaying the determination result.

In another aspect of achieving the above object, a moving body management method by an information processing device according to another aspect of the present invention includes receiving moving body identification information from an information processing terminal device that has received the moving body identification information transmitted from a moving body, the moving body identification information being information with which the moving body can be identified and indicating a state of the moving body, determining whether the moving body has entered an area where entry is prohibited by collating the received moving body identification information with entry permission management information indicating an area where entry is permitted or prohibited with respect to the moving body, and transmitting, to the information processing terminal device, a determination result on whether the moving body has entered an area where entry is prohibited, the information processing terminal device being capable of displaying the determination result.

In a further viewpoint of achieving the above object, a moving body management program according to another further aspect of the present invention causes a computer to execute a reception process of receiving moving body identification information from an information processing terminal device that has received the moving body identification information transmitted from a moving body, the moving body identification information being information with which the moving body can be identified and indicating a state of the moving body, a determination process of determining whether the moving body has entered an area where entry is prohibited by collating the received moving body identification information with entry permission management information indicating an area where entry is permitted or prohibited with respect to the moving body, and a transmission process of transmitting, to the information processing terminal device, a determination result from the determination process, the information processing terminal device being capable of displaying the determination result.

Furthermore, the present invention can also be achieved by a computer-readable non-volatile recording medium in which the moving body management program (computer program) is stored.

Advantageous Effects of Invention

According to the present invention, a moving body management device and the like capable of accurately detecting a moving body that has illegally entered a monitoring target area are obtained.

EXAMPLE EMBODIMENT

Hereinafter, example embodiments of the present invention will be described in detail with reference to the drawings.

First Example Embodiment

Figure 1:
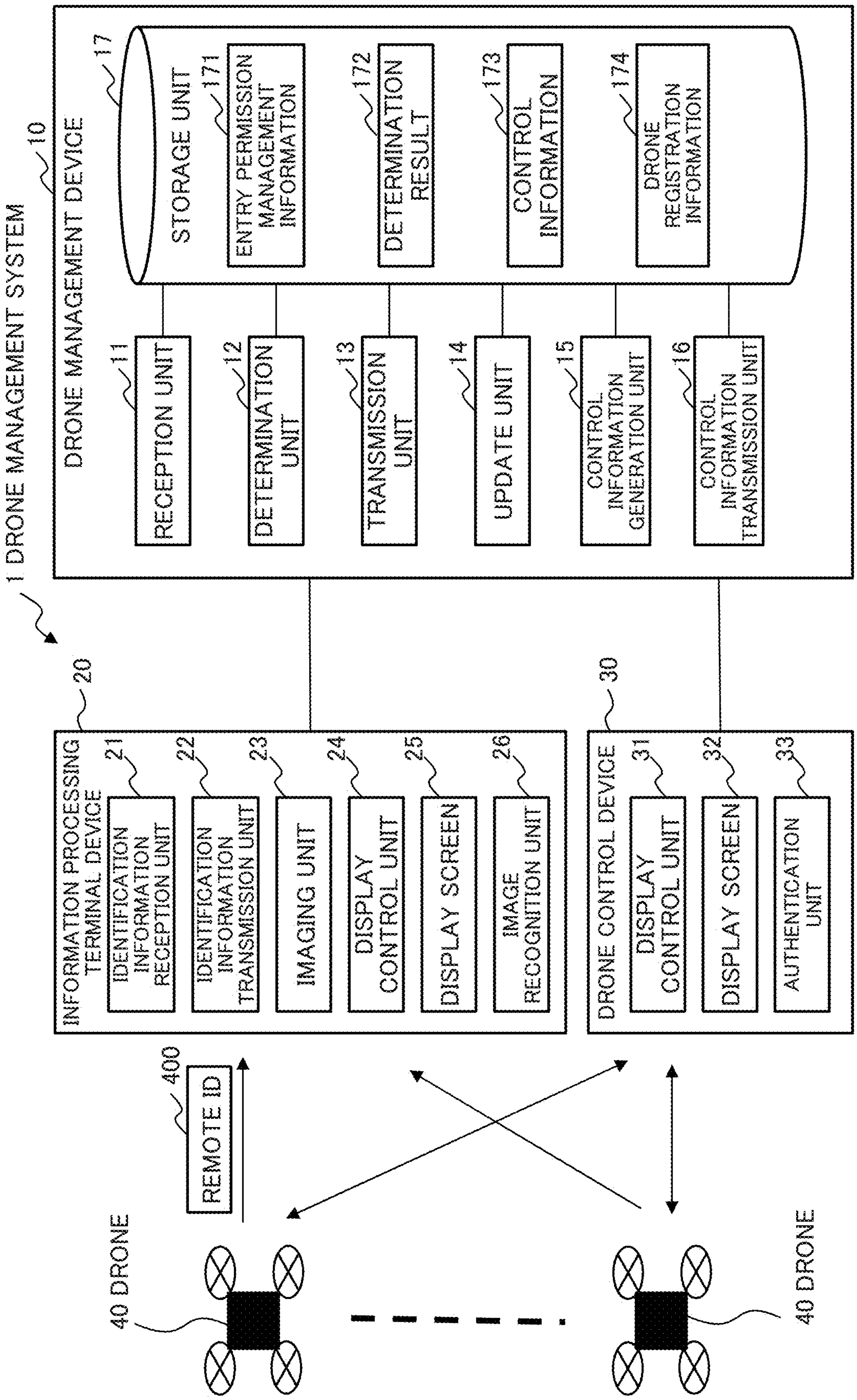
FIG. 1 is a block diagram illustrating a configuration of a drone management system 1 according to a first example embodiment of the present invention.

FIG. 1 is a block diagram illustrating a configuration of a drone management system 1 according to a first example embodiment of the present invention. The drone management system 1 according to the present example embodiment is a system that manages an entry permitted area or an entry prohibited area of each of one or more drones 40 (an example of a moving body) and manages whether illegal flight (entry to the entry prohibited area, or the like) by the drone 40 is performed.

Assume that the drone 40 emits (transmits) the remote ID 400. The remote ID is a mechanism for emitting, from a drone, information with which a fuselage can be identified and, thus, remotely collecting identification information emitted from the drone. The remote ID 400 includes, for example, a registration symbol, a manufacturing number, position information, time, and the like as information with which the drone 40 can be identified. The information included in the remote ID 400 is not limited to the above-described information, and may include, for example, information indicating the state of the drone 40.

The drone management system roughly includes a drone management device 10, an information processing terminal device 20, and a drone control device 30. The drone management device 10 and the drone control device 30 are examples of a moving body management device and a moving body control device in order. The information processing terminal device 20 and the drone control device 30 are communicably connected to the drone management device 10 via, for example, a wireless or wired communication network.

The information processing terminal device 20 is an equipment (in the present example embodiment, hereinafter sometimes referred to as a remote identification terminal) having a function of collecting the remote ID 400, and is, for example, an equipment possessed by a specific person such as a police officer, a security guard, or an administrator of an important facility. Alternatively, the information processing terminal device 20 may be a terminal device such as a smartphone possessed by a general person in which an application for achieving the function of the remote identification terminal is installed. The information processing terminal device 20 includes an identification information reception unit 21, an identification information transmission unit 22, an imaging unit 23, a display control unit 24, a display screen 25, and an image recognition unit 26. The display control unit 24 and the image recognition unit 26 are an example of a display control means and an image recognition means in order. The imaging unit 23 is, for example, a camera capable of imaging the drone 40 and the like.

The identification information reception unit 21 receives the remote ID 400 transmitted from the drone 40. However, it is assumed that the drone 40 transmits the remote ID 400 by using a communication method that can be received by the information processing terminal device 20.

The identification information transmission unit 22 transmits the remote ID 400 received by the identification information reception unit 21 to the drone management device 10 that manages the drone 40. The identification information transmission unit 22 may attach an imaged image of the drone 40 imaged by the imaging unit 23 to the remote ID 400 and transmit the imaged image to the drone management device 10.

The display control unit 24, the display screen 25, and the image recognition unit 26 in the information processing terminal device 20 will be described later.

The drone management device 10 is an information processing device such as a server, and includes a reception unit 11, a determination unit 12, a transmission unit 13, an update unit 14, a control information generation unit 15, a control information transmission unit 16, and a storage unit 17. The reception unit 11, the determination unit 12, the transmission unit 13, the update unit 14, the control information generation unit 15, and the control information transmission unit 16 are examples of a reception means, a determination means, a transmission means, an update means, a control information generation means, and a control information transmission means in order.

The storage unit 17 is, for example, a storage device such as a random access memory (RAM) or a hard disk 904 described later with reference to FIG. 7. The storage unit 17 stores entry permission management information 171, determination result 172, control information 173, and drone registration information 174. Details of these pieces of information stored in the storage unit 17 will be described later.

The reception unit 11 receives the remote ID 400 and the imaged image in which the drone 40 is imaged transmitted by the identification information transmission unit 22 of the information processing terminal device 20 in the above manner. The reception unit 11 may also store the remote ID 400 and the imaged image in which the drone 40 is imaged in the storage unit 17.

The determination unit 12 collates the received remote ID 400 with the entry permission management information 171 stored in the storage unit 17 to determine whether the drone 40 identified by the remote ID 400 has entered an area where entry is prohibited. The entry permission management information 171 is information indicating an area where entry is permitted or entry is prohibited for each drone 40.

The entry permission management information 171 associates, for example, a registration symbol of the drone 40 included in the remote ID 400 with a place of an area (entry permitted area) where entry is permitted for the drone 40 or an area (entry prohibited area) where entry is prohibited. For example, in a case where the area is represented by a polygon on the ground surface, the place of the entry permitted area or the entry prohibited area can be represented by coordinates (e.g., latitude and longitude) on the ground surface of each vertex constituting the polygon.

The entry permission management information 171 may also include information indicating height (altitude) with respect to the entry permitted area or the entry prohibited area. For example, regarding a certain area represented two-dimensionally on the ground surface, the entry permission management information 171 may indicate that an area represented three-dimensionally less than 300 meters from the ground surface is an entry prohibited area, and an area represented three-dimensionally 300 meters or more from the ground surface is an entry permitted area.

When the position of the drone 40 indicated by the received remote ID 400 is inside the entry prohibited area of the drone 40 indicated by the entry permission management information 171, the determination unit 12 generates a determination result 172 indicating that the drone 40 has entered the entry prohibited area. Alternatively, when the position of the drone 40 indicated by the received remote ID 400 is outside the entry permitted area of the drone 40 indicated by the entry permission management information 171, the determination unit 12 generates a determination result 172 indicating that the drone 40 has entered the entry prohibited area.

The determination unit 12 also checks whether a registration symbol of the drone 40 indicated by the received remote ID 400 is, for example, registered in the drone registration information 174 (moving body registration information). The drone registration information 174 represents, for example, a list of registration symbols of the drone 40 that caused a problem such as illegally entering the entry prohibited area in the past. Alternatively, the drone registration information 174 may represent a list of registration symbols of the drones 40 that have not caused any problem after notification of the fuselage has been properly performed. It is assumed that the drone registration information 174 is given in advance by, for example, an administrator or the like of the drone management device 10.

When the registration symbol indicated by the received remote ID 400 is registered in the drone registration information 174 indicating the list of registration symbols of the drone 40 that has caused the problem, the determination unit 12 generates a determination result 172 indicating that the drone 40 specified by the received remote ID 400 requires attention. Alternatively, when the registration symbol indicated by the received remote ID 400 is not registered in the drone registration information 174 indicating the list of registration symbols of the drone 40 that has not caused any problem, the determination unit 12 generates a determination result 172 indicating that the drone 40 specified by the received remote ID 400 requires attention.

The determination unit 12 stores the determination result 172 generated as described above in the storage unit 17.

The transmission unit 13 transmits the determination result 172 to the information processing terminal device 20. The transmission unit 13 may also transmit the entry permission management information 171 related to the drone 40 indicated by the determination result 172 to the information processing terminal device 20. That is, in this case, the transmission unit 13 transmits, to the information processing terminal device 20, information indicating the place of the entry permitted area or the entry prohibited area related to the drone 40, which is indicated by the entry permission management information 171.

The display control unit 24 of the information processing terminal device 20 displays the determination result 172 transmitted from the transmission unit 13 of the drone management device on the display screen 25. The display control unit 24 may also display, on the display screen 25, a map on which registration symbols and the like of the drone 40 included in the remote ID 400 are displayed at the position of the drone 40 indicated by the received remote ID 400.

Figure 2:
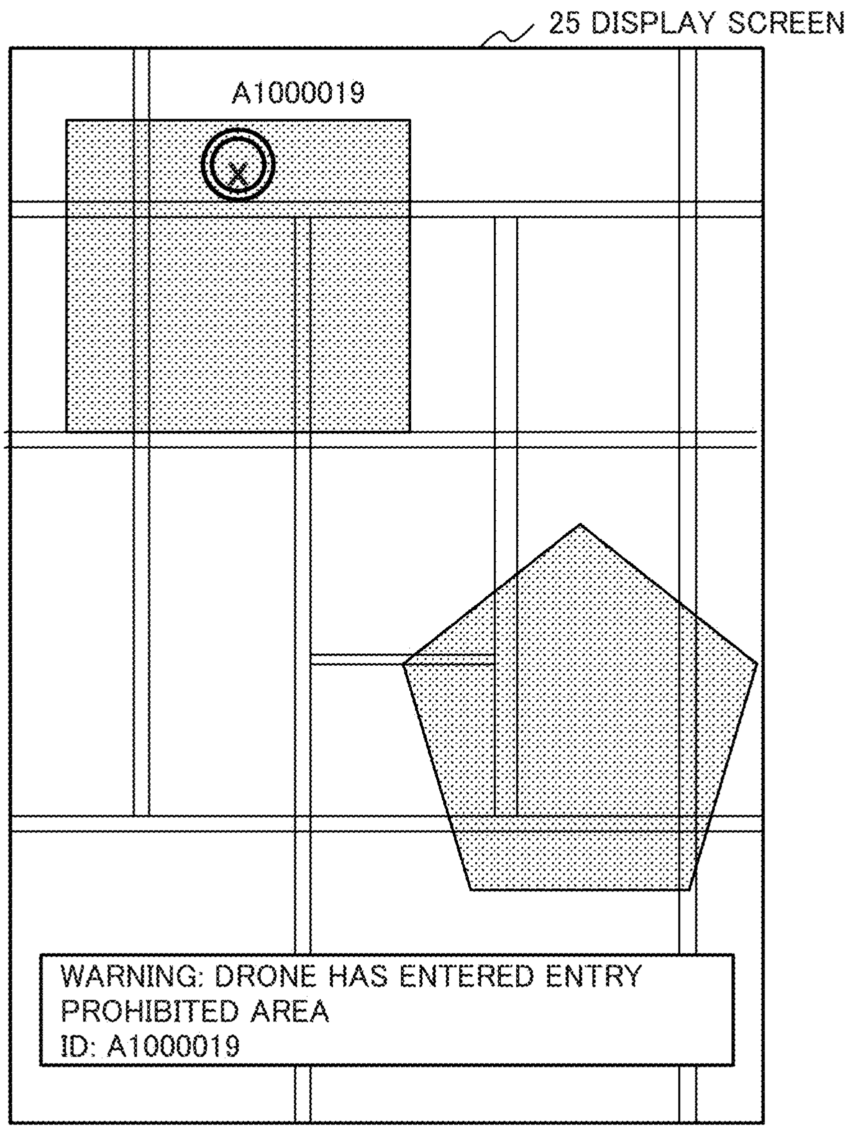
FIG. 2 is a diagram illustrating a first example of a mode in which the drone management system 1 according to the first example embodiment of the present invention displays information of a drone 40 that has entered an entry prohibited area on a display screen 25 of an information processing terminal device 20.

FIG. 2 is a diagram illustrating a first example of a mode in which the display control unit 24 of the information processing terminal device 20 according to the present example embodiment displays information of the drone 40 that has entered the entry prohibited area on the display screen 25. In the example illustrated in FIG. 2, the display control unit 24 displays, on the display screen 25, a warning indicating that the drone 40 whose registration symbol is "A1000019" has entered the entry prohibited area. However, quadrangular and pentagonal shaded areas in the map displayed on the display screen 25 illustrated in FIG. 2 represent the entry prohibited areas of the drone 40 displayed as double circles on the display screen 25. It is assumed that the information processing terminal device 20 can acquire information representing the map illustrated in FIG. 2 from the drone management device 10 or another external device.

Figure 3:
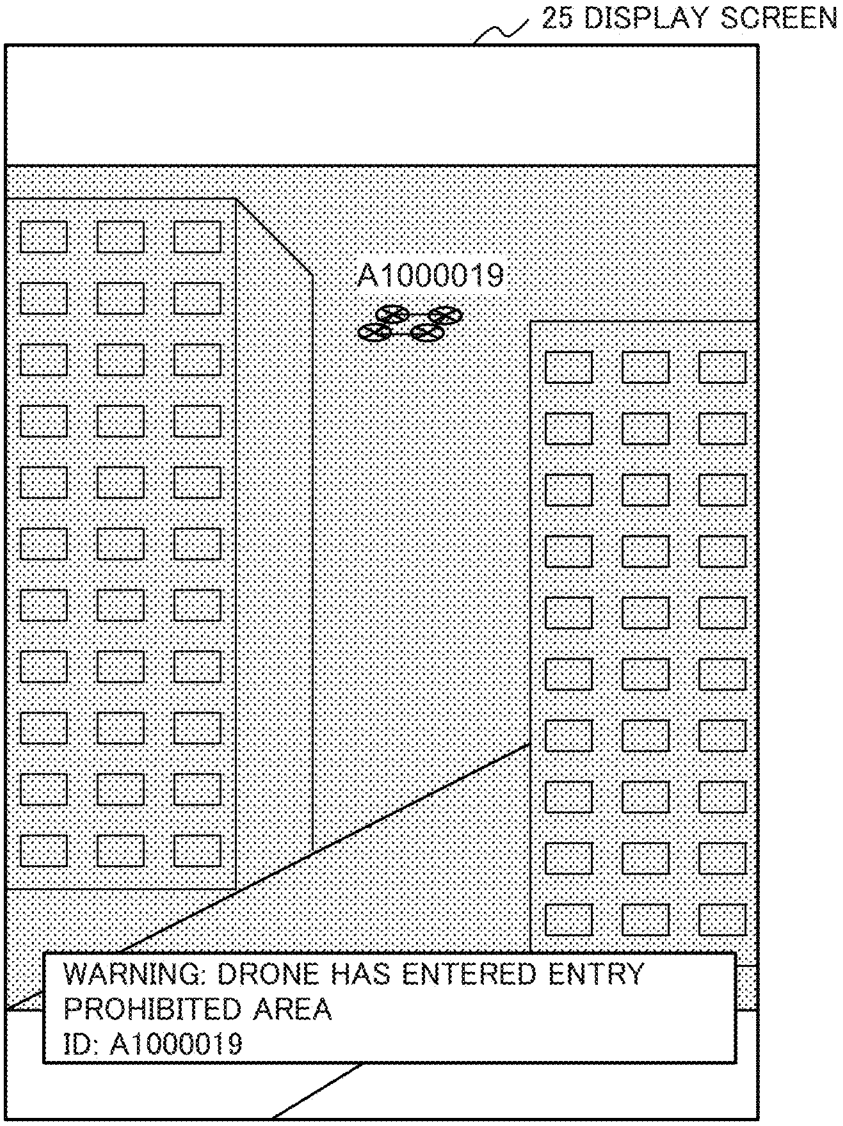
FIG. 3 is a diagram illustrating a second example of a mode in which the drone management system 1 according to the first example embodiment of the present invention displays information of the drone 40 that has entered an entry prohibited area on the display screen 25 of the information processing terminal device 20.

FIG. 3 is a diagram illustrating a second example of a mode in which the display control unit 24 of the information processing terminal device 20 according to the present example embodiment displays information of the drone 40 that has entered the entry prohibited area on the display screen 25. In the example illustrated in FIG. 3, the display control unit 24 displays, on the display screen 25, the imaged image of the drone 40 in which the registration symbol "A1000019" of the drone 40 is superimposed on the drone 40. As in the example illustrated in FIG. 2, the display control unit 24 displays, on the display screen 25, a warning indicating that the drone 40 whose registration symbol is "A1000019" has entered the entry prohibited area. However, the shaded area displayed by being superimposed on the imaged image displayed on the display screen 25 as illustrated in FIG. 3 represents the entry prohibited area of the drone 40 displayed on the display screen 25. In the example illustrated in FIG. 3, the entry permission management information 171 indicates that an area having a higher altitude than the shaded area is the entry permitted area for the imaged drone 40.

As illustrated in FIG. 3, the display control unit 24 may display the information of the drone 40 on the display screen 25 by a map of a three-dimensional display mode acquired from an external device or the like in place of the imaged image by the imaging unit 23.

In addition, as described above, in a case where the display control unit 24 displays the imaged image of the drone 40 in which the remote ID 400 is superimposed on the drone 40 on the display screen 25, there is a case where the orientation of the drone 40 based on the information processing terminal device 20 calculated from the value indicated by the geomagnetic sensor (not illustrated) included in the information processing terminal device 20 deviates from the actual orientation. Therefore, the display control unit 24 may correct the orientation of the drone 40 calculated from the value indicated by the geomagnetic sensor by using a gravitational acceleration vector indicated by a gravitational acceleration sensor (not illustrated) included in the information processing terminal device 20.

The image recognition unit 26 of the information processing terminal device 20 recognizes (extracts) the drone 40 included in the imaged image by performing image recognition process on the imaged image by the imaging unit 23. Since the image recognition process is a well-known technique, a detailed description thereof will be omitted in the present example embodiment.

In a case where the identification information reception unit 21 cannot receive the remote ID 400 from the drone 40 even though the presence of the drone 40 in the imaged image is recognized by the image recognition unit 26, the display control unit 24 displays that the drone 40 is a suspicious machine on the display screen 25. It is estimated that the reason the identification information reception unit 21 cannot receive the remote ID 400 is because the drone 40 has not transmitted the remote ID 400. That is, the display control unit 24 specifies the drone 40 that has not transmitted the remote ID 400 as a suspicious machine.

In addition, in a case where the determination result 172 received from the drone management device 10 indicates that the drone 40 specified by the received remote ID 400 requires attention, the display control unit 24 displays a warning indicating that the drone 40 requires attention on the display screen 25.

The control information generation unit 15 of the drone management device 10 generates the control information 173 for controlling the movement of the drone 40 in such a way as not to enter the entry prohibited area indicated by the entry permission management information 171 based on the remote ID 400 related to the drone 40 and the entry permission management information 171.

The control information transmission unit 16 transmits the control information 173 generated by the control information generation unit 15 as described above to the drone control device 30 that controls the movement of the drone 40. The drone control device 30 may be a device that automatically performs the flight control of the drone 40, or may be a controller that accepts an input operation made by a pilot who operates the drone 40. However, in a case where the drone control device 30 is the controller, the drone control device 30 transmits the remote ID 400 of the drone 40 to be operated to the drone management device 10. Then, the control information transmission unit 16 may also transmit the entry permission management information 171 related to the drone 40 to be operated to the drone control device 30. That is, in this case, the control information transmission unit 16 transmits, to the drone control device 30, information indicating the place of the entry permitted area or the entry prohibited area related to the drone 40 to be operated, which is indicated by the entry permission management information 171.

The drone control device 30 includes a display control unit 31, a display screen 32, and an authentication unit 33 in a case of being a controller that accepts an input operation made by a pilot who operates the drone 40. The display control unit 31 and the authentication unit 33 are an example of a display control means and an authentication means in order.

In a case where the drone control device 30 is a device that automatically performs the flight control of the drone 40, the control information generation unit 15 generates the control information 173 in a data format that enables the drone control device 30 to perform flight control of the drone 40. In this case, the drone control device 30 may be included in the drone management device 10.

In a case where the drone control device 30 is the controller described above, the control information generation unit 15 generates the control information 173 instructing the input operation. In this case, the display control unit 31 of the drone control device 30 displays the control information 173 received from the drone management device 10 on the display screen 32. In this case, the pilot may operate the drone 40 in such a way as not to enter the entry prohibited area in accordance with the control information 173 displayed on the display screen 32.

The display control unit 31 may also display, on the display screen 32, the information indicating the place of the entry permitted area or the entry prohibited area related to the drone 40 to be operated indicated by the entry permission management information 171 transmitted from the control information transmission unit 16 of the drone management device 10 in, for example, a mode similar to the mode illustrated in FIG. 2 or FIG. 3. However, it is assumed that the imaged image displayed on the display screen 32 by the display control unit 31 is an imaged image imaged by a camera mounted on the drone 40 to be operated. Therefore, unlike the case of FIG. 3, the imaged image displayed on the display screen 32 by the display control unit 31 does not include the drone 40 to be operated. The display control unit 31 displays the information indicating the place of the entry permitted area or the entry prohibited area on the display screen 32 as described above, so that the pilot operating the drone 40 can easily visually recognize the entry prohibited area of the drone 40.

The authentication unit 33 of the drone control device 30 authenticates the pilot by using the authentication information in which the remote ID 400 of the drone 40 to be operated is associated with pre-registration information representing the pilot. For example, the authentication unit 33 determines whether biometric information such as a fingerprint or a PIN number input by the pilot before operating matches pre-registration information registered in association with the remote ID 400. When the fingerprint or the PIN number input by the pilot matches the pre-registration information, the authentication unit 33 sets the drone control device 30 to a state of accepting an operate operation by the pilot. When the fingerprint or the PIN number input by the pilot does not match the pre-registration information, the authentication unit 33 sets the drone control device 30 to a state of not accepting an operate operation by the pilot.

The update unit 14 of the drone management device 10 updates the entry permission management information 171 such that as the amount paid by the user (pilot) of the drone 40 for the entry permitted area of the drone 40 becomes larger, the entry permitted area of the drone 40 associated with the identification information with which the user can be identified becomes larger (wider). However, it is assumed that the drone management device 10 can communicate with a system that manages the payment amount of the user of the drone 40.

For example, in a case where the drone 40 images an image of an event such as sports, the update unit 14 updates the entry permission management information 171 in such a way that the entry permitted area is increased such that the drone 40 with a higher paid amount for the entry permitted area can image an image of the event under a better condition.

Next, the operation (process) of the drone management system 1 according to the present example embodiment will be described in detail with reference to the flowcharts of FIGS. 4A to 5B.

Figure 4A:
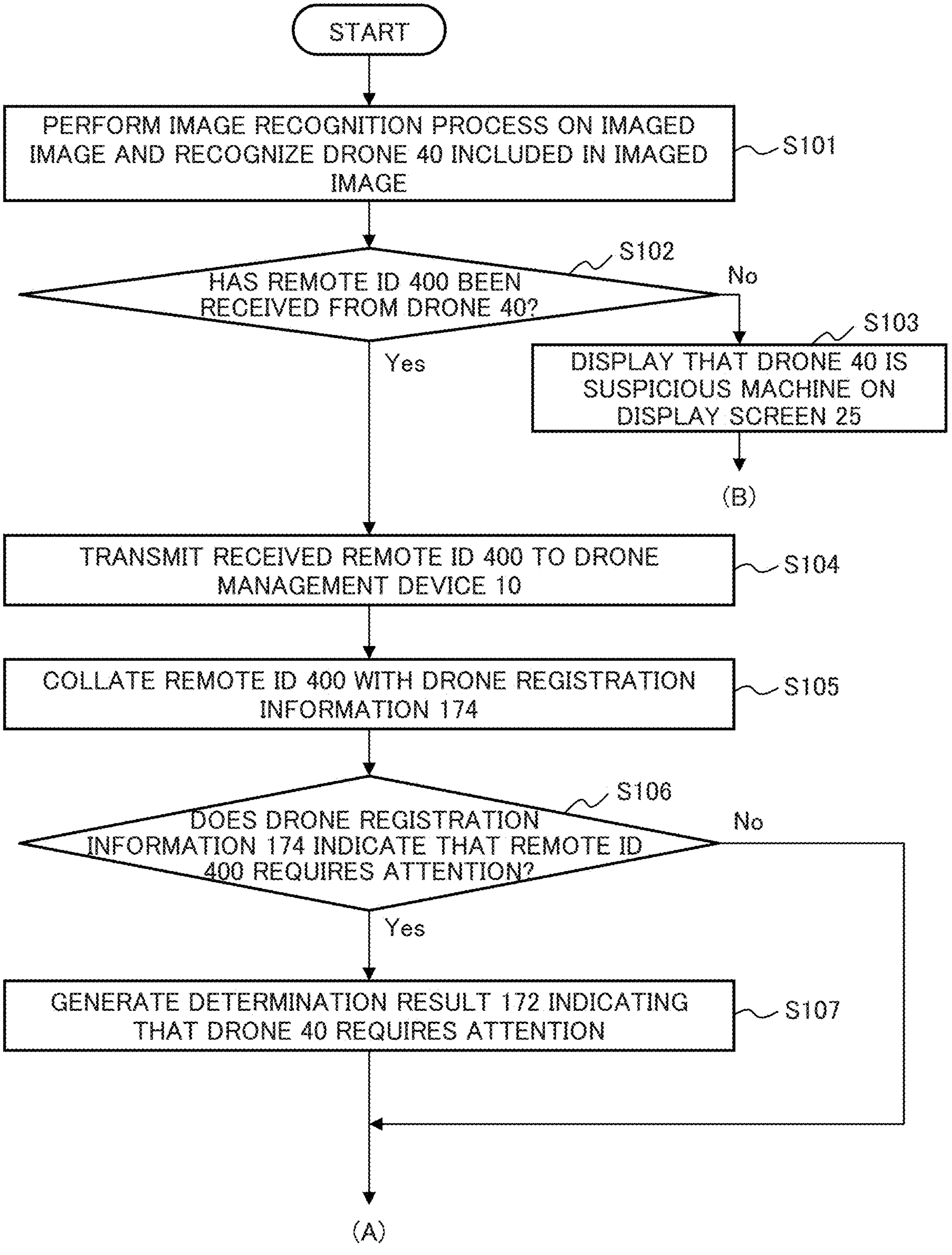
FIG. 4A is a flowchart (1/2) illustrating an operation in which the drone management system 1 according to the first example embodiment of the present invention determines whether the drone 40 recognized by the information processing terminal device 20 has entered the entry prohibited area.
Figure 4B:
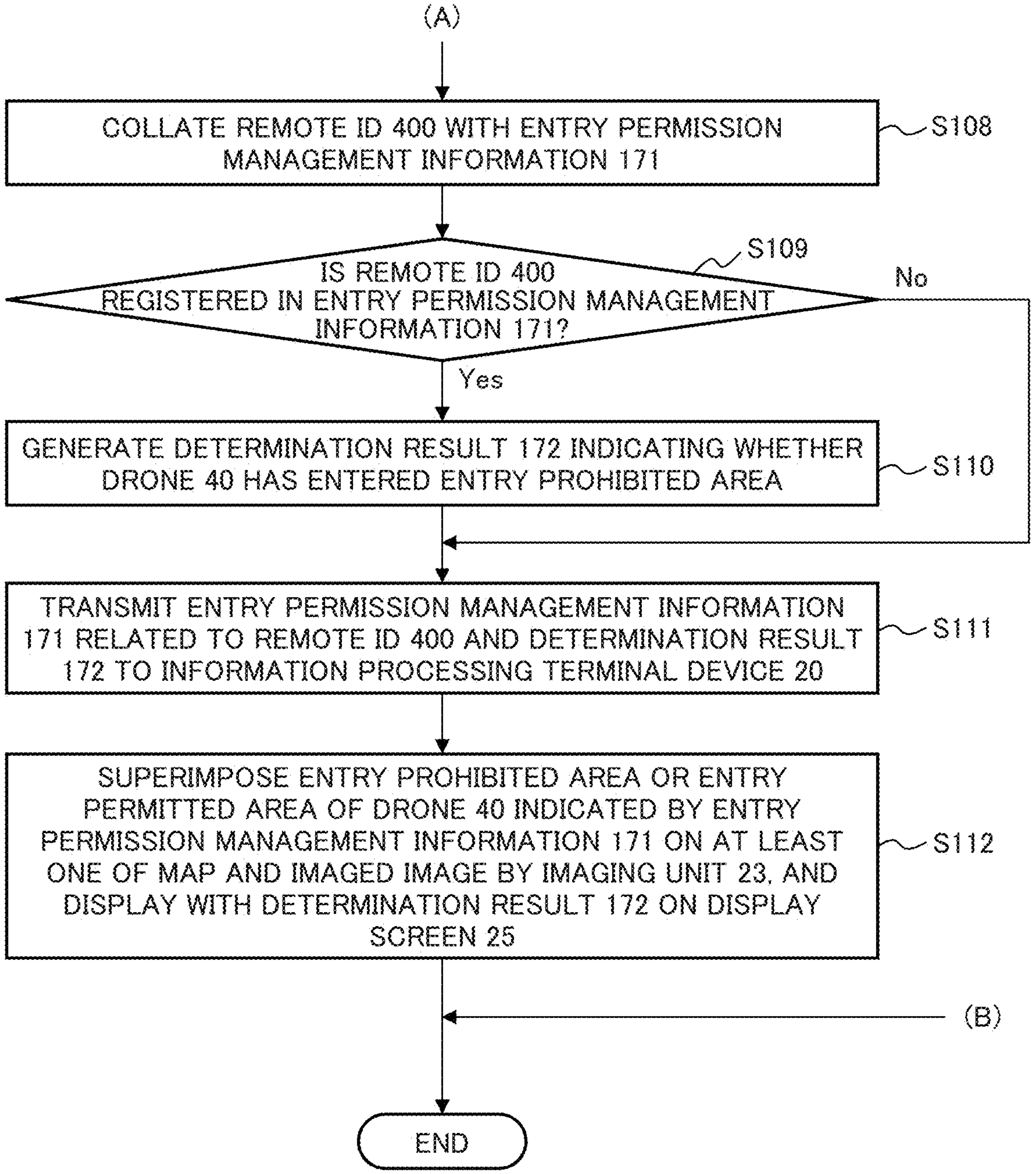
FIG. 4B is a flowchart (2/2) illustrating an operation in which the drone management system 1 according to the first example embodiment of the present invention determines whether the drone 40 recognized by the information processing terminal device 20 has entered the entry prohibited area.

FIGS. 4A and 4B are flowcharts illustrating an operation in which the drone management system 1 according to the present example embodiment determines whether the drone 40 recognized by the information processing terminal device 20 has entered the entry prohibited area.

The image recognition unit 26 of the information processing terminal device 20 performs image recognition process on the imaged image imaged by the imaging unit 23, and recognizes the drone 40 included in the imaged image (step S101). When the identification information reception unit 21 cannot receive the remote ID 400 from the drone 40 (No in step S102), the display control unit 24 displays that the imaged drone 40 is a suspicious machine on the display screen 25 (step S103), and the entire process is ended.

When the identification information reception unit 21 receives the remote ID 400 from the drone 40 (Yes in step S102), the identification information transmission unit 22 transmits the remote ID 400 received by the identification information reception unit 21 to the drone management device 10 (step S104). The determination unit 12 of the drone management device 10 collates, for example, the registration symbol included in the remote ID 400 received by the reception unit 11 from the information processing terminal device 20 with the drone registration information 174 (step S105).

In a case where the drone registration information 174 indicates that the drone 40 identified by the remote ID 400 requires attention (Yes in step S106), the determination unit 12 generates the determination result 172 indicating that the drone 40 requires attention (step S107). When the drone registration information 174 indicates that the drone 40 identified by the remote ID 400 does not require attention (No in step S106), the process proceeds to step S108.

The determination unit 12 collates, for example, the registration symbol included in the remote ID 400 received by the reception unit 11 from the information processing terminal device 20 with the entry permission management information 171 (step S108). When the registration symbol included in the remote ID 400 is registered in the entry permission management information 171 (Yes in step S109), the determination unit 12 generates the determination result 172 indicating whether the drone 40 has entered the entry prohibited area indicated by the entry permission management information 171 (step S110). When the registration symbol included in the remote ID 400 is not registered in the entry permission management information 171 (No in step S109), the process proceeds to step S111.

The transmission unit 13 transmits the entry permission management information 171 and the determination result 172 related to the remote ID 400 to the information processing terminal device 20 (step S111). The display control unit 24 of the information processing terminal device 20 superimposes the entry prohibited area or the entry permitted area of the drone 40 indicated by the entry permission management information 171 received from the drone management device on at least one of the map or the imaged image by the imaging unit 23, and displays the same on the display screen 25 together with the determination result 172 (step S112), and the entire process is ended.

Figure 5A:
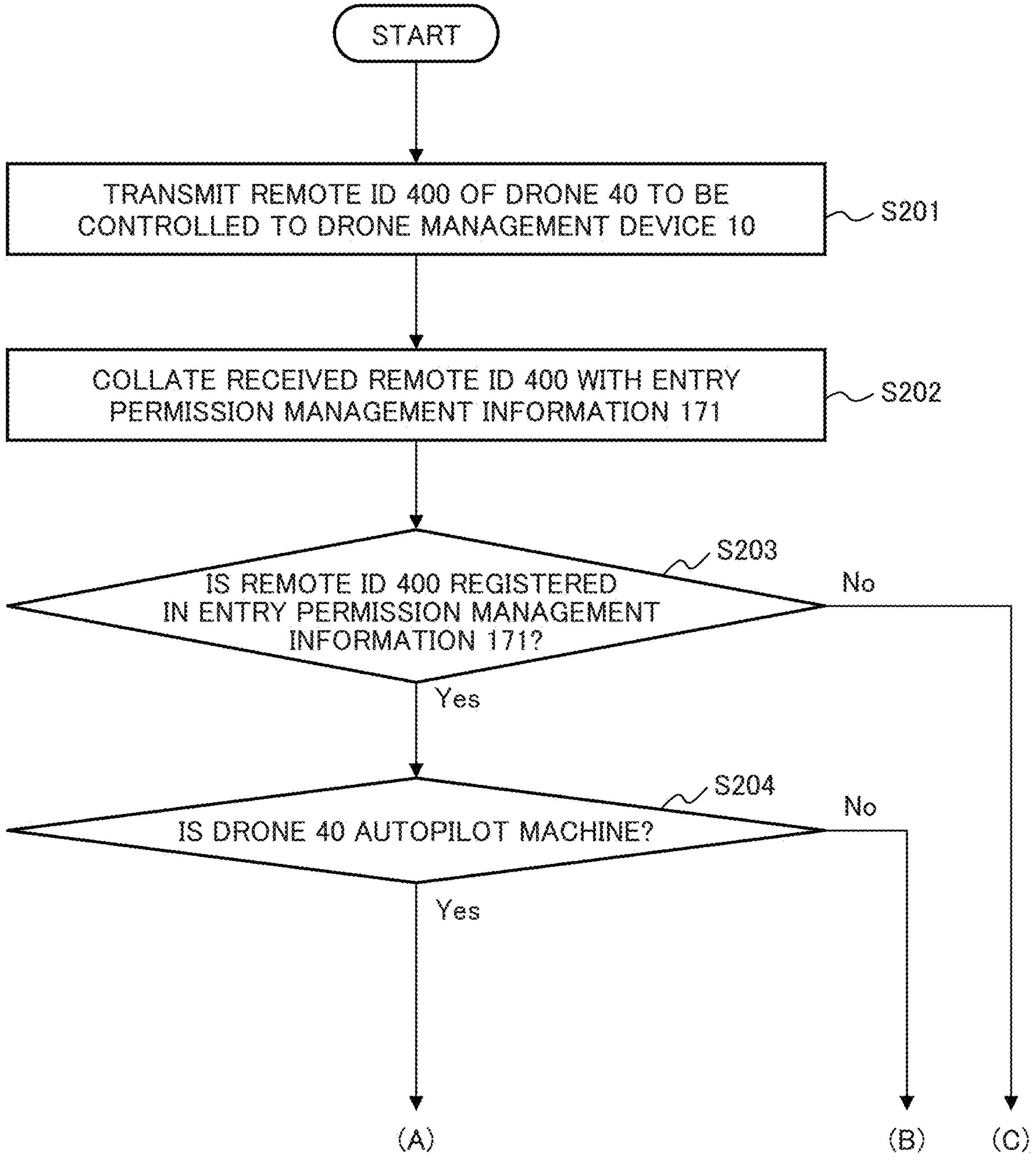
FIG. 5A is a flowchart (1/2) illustrating an operation in which the drone management system 1 according to the first example embodiment of the present invention controls the drone 40 in such a way as not to enter the entry prohibited area.
Figure 5B:
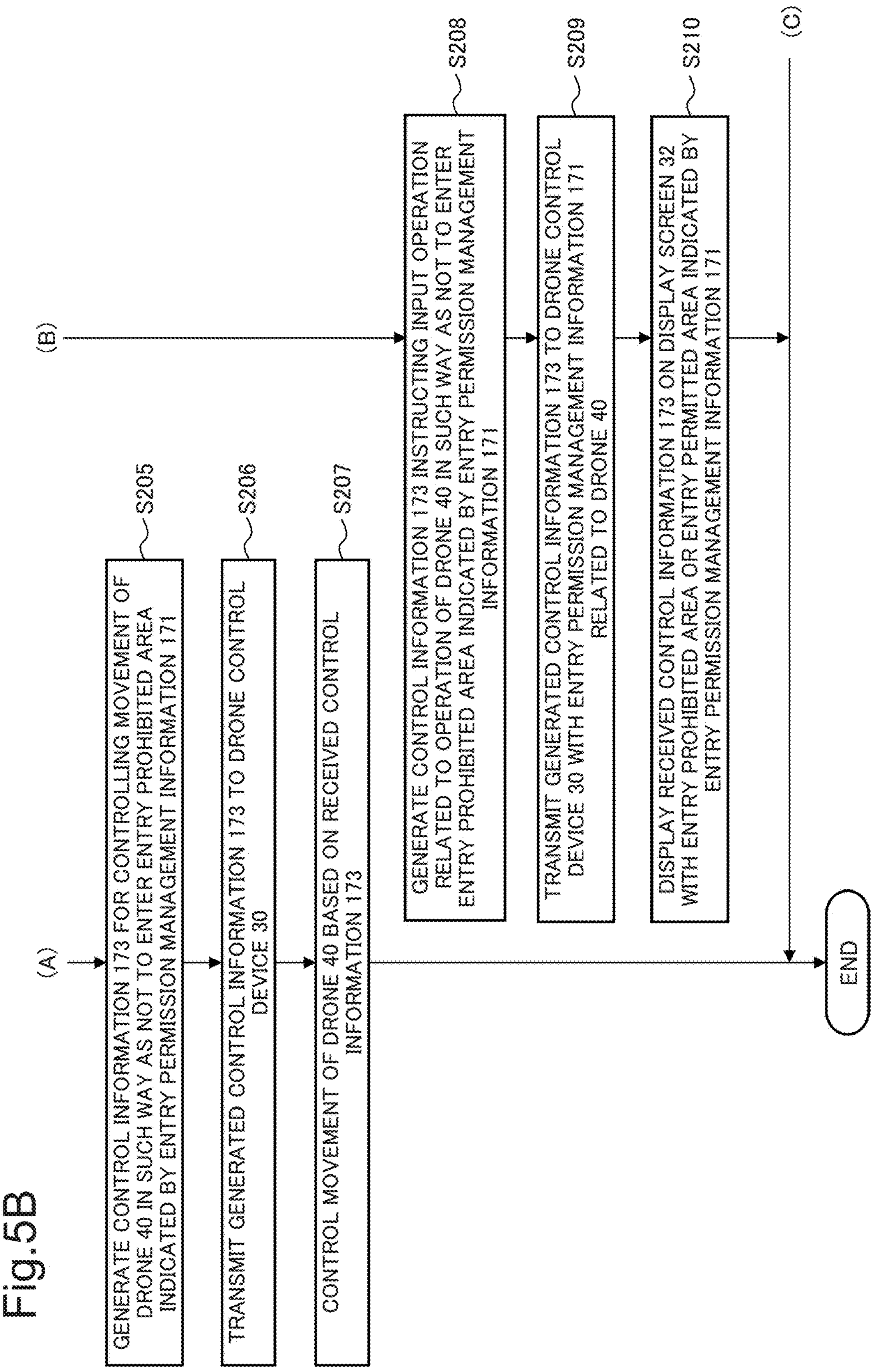
FIG. 5B is a flowchart (2/2) illustrating an operation in which the drone management system 1 according to the first example embodiment of the present invention controls the drone 40 in such a way as not to enter the entry prohibited area.

FIGS. 5A and 5B are flowcharts illustrating an operation in which the drone management system 1 according to the present example embodiment controls the drone 40 in such a way as not to enter the entry prohibited area.

The drone control device 30 transmits the remote ID 400 of the drone 40 to be controlled to the drone management device 10 (step S201). The determination unit 12 of the drone management device collates, for example, the registration symbol included in the remote ID 400 received by the reception unit 11 from the drone control device 30 with the entry permission management information 171 (step S202).

When the registration symbol included in the remote ID 400 is not registered in the entry permission management information 171 (No in step S203), the entire process is ended. When the registration symbol included in the remote ID 400 is registered in the entry permission management information 171 (Yes in step S203), the process proceeds to step S204.

When the drone 40 to be controlled is an autopilot machine (Yes in step S204), the process proceeds to step S205. When the drone 40 to be controlled is not an autopilot machine (i.e., operated by the pilot) (No in step S204), the process proceeds to step S208.

The control information generation unit 15 of the drone management device 10 generates the control information 173 for controlling the movement of the drone 40 in such a way as not to enter the entry prohibited area indicated by the entry permission management information 171 (step S205). The control information transmission unit 16 transmits the control information 173 generated by the control information generation unit 15 to the drone control device 30 (step S205). The drone control device 30 controls the movement of the drone 40 based on the control information 173 received from the drone management device 10 (step S207), and the entire process is ended.

The control information generation unit 15 of the drone management device 10 generates the control information 173 for instructing an input operation related to the operating of the drone 40 in such a way as not to enter the entry prohibited area indicated by the entry permission management information 171 (step S208). The control information transmission unit 16 transmits the control information 173 generated by the control information generation unit 15 to the drone control device 30 together with the entry permission management information 171 related to the drone 40

(step S209). The display control unit 31 of the drone control device 30 displays the received control information 173 on the display screen 32 together with the entry prohibited area the entry permitted area indicated by the entry permission management information 171 (step S210), and the entire process is ended.

The drone management device 10 (moving body management device) according to the present example embodiment can achieve accurate detection of the drone 40 (moving body) that has illegally entered the monitoring target area. This is because the drone management device 10 determines whether the drone 40 has entered the entry prohibited area by collating the remote ID 400 (moving body identification information) received from the information processing terminal device 20 with the entry permission management information 171, and transmits the determination result 172 to the information processing terminal device 20.

Hereinafter, effects achieved by the drone management device 10 according to the present example embodiment will be described in detail.

As opportunities for using a moving body such as a drone increase, for example, the occurrence of cases in which a drone enters an important facility and images the facility also increases, and thus, detection of an illegally entered drone by a security guard or the like is being performed at the periphery of the important facility or the like. In this case, the drone flying through the peripheral area of the important facility is not necessarily a suspicious drone, and the drone permitted to enter the peripheral area may be erroneously detected as a suspicious drone. Alternatively, conversely, there is a case where a security guard erroneously recognizes a drone that is not permitted to enter the peripheral area with a drone that has been permitted to enter, thereby overlooking a suspicious drone. That is, it is a problem to accurately detect a moving body such as a drone that has illegally entered a monitoring target area.

In view of such a problem, the drone management device 10 according to the present example embodiment includes the reception unit 11, the determination unit 12, and the transmission unit 13, and operates as described above, for example, with reference to FIGS. 1 to 5B. That is, the reception unit 11 receives the remote ID 400, which is transmitted from the drone 40, with which the drone 40 can be identified, and which represents the state of the drone 40, from the information processing terminal device 20 that has received the remote ID 400. The determination unit 12 collates the received remote ID 400 with the entry permission management information 171 indicating the area where the entry of the drone 40 is permitted or prohibited, thereby determining whether the drone 40 has entered the area where the entry is prohibited. Then, the transmission unit 13 transmits the determination result 172 by the determination unit 12 to the information processing terminal device 20 capable of displaying the determination result 172.

That is, the drone management device 10 according to the present example embodiment manages the remote ID 400 and the entry prohibited area or the entry permitted area in association with each other, thereby determining whether the drone 40 identified by the remote ID 400 collected by the information processing terminal device 20 has entered the entry prohibited area, and presenting the determination result 172 to the security guard or the like via the information processing terminal device 20. As a result, the drone management device 10 can accurately detect the drone 40 that has illegally entered the monitoring target area.

In addition, the drone management device 10 according to the present example embodiment updates the entry permission management information 171 such that the area where the entry of the drone 40 is permitted increases as the payment amount regarding the entry permitted area of the user of the drone 40 increases. As a result, in an event such as sports, for example, the drone management device 10 can achieve a flexible response such as giving more suitable imaging conditions by the drone 40 to the user of the drone 40 having a high payment amount regarding the entry permitted area.

In addition, the drone management device 10 according to the present example embodiment generates the control information 173 for controlling the movement of the drone 40 in such a way that the drone 40 does not enter the entry prohibited area of the drone 40 indicated by the entry permission management information 171 from the state of the drone 40 indicated by the remote ID 400, and transmits the control information 173 to the drone control device 30. As a result, the drone management device 10 can reduce the entry of the drone 40 into the entry prohibited area.

In addition, the information processing terminal device 20 according to the present example embodiment displays at least one of the map on which the remote ID 400 is displayed at the position of the drone 40 indicated by the received remote ID 400 or the imaged image of the drone 40 in which the remote ID 400 is superimposed on the drone 40 on the display screen 25 together with the determination result 172, for example, as illustrated in FIG. 2 or FIG. 3. As a result, the drone management system 1 can present information on the drone 40 to a security guard or the like who possesses the information processing terminal device 20 in an easy-to-understand manner.

Furthermore, the information processing terminal device 20 according to the present example embodiment performs image recognition process of recognizing the drone 40 in the imaged image, and displays that the drone 40 is suspicious on the display screen 25 in a case where the remote ID 400 cannot be received from the recognized drone 40. The information processing terminal device 20 further displays, on the display screen 25, a result of collation of the remote ID 400 with the drone registration information 174 indicating whether the drone 40 requires attention by the drone management device 10. As a result, the drone management system 1 can more reliably present the fact that the drone 40 is a suspicious drone to a security guard or the like who possesses the information processing terminal device 20.

Furthermore, in a case where the drone control device 30 according to the present example embodiment is a controller that accepts an input operation made by a pilot of the drone 40, the entry permission management information 171 is superimposed on at least one of the map on which the remote ID 400 is displayed at the position of the drone 40 indicated by the remote ID 400 or the imaged image imaged by the drone 40, and displayed on the display screen 32. The drone control device 30 further superimposes the entry prohibited area or the entry permitted area on at least one of the map or the imaged image by using the entry permission management information 171 including the three-dimensional coordinates related to the entry prohibited area or the entry permitted area, and displays the same on the display screen 32 in a three-dimensional display mode. As a result, the drone management system 1 can intelligibly assist the pilot in operating the drone 40 in such a way as not to enter the entry prohibited area.

In addition, in a case where the drone control device 30 according to the present example embodiment is a controller that accepts an input operation made by the pilot of the drone 40, the pilot is authenticated using authentication information in which the remote ID 400 of the drone 40 to be controlled is associated with pre-registration information representing the pilot. As a result, the drone management system 1 can prevent a person other than a valid pilot of the drone 40 from illegally operating the drone 40.

The information with which the drone 40 can be identified collected by the information processing terminal device 20 is not limited to the remote ID 400. The information processing terminal device 20 may collect information with which the drone 40 having a specification different from that of the remote ID 400 can be identified.

Furthermore, the drone management system 1 (moving body management system) may manage a moving body other than the drone 40. The drone management system 1 may manage, for example, a movable robot or the like.

Second Example Embodiment

Figure 6:
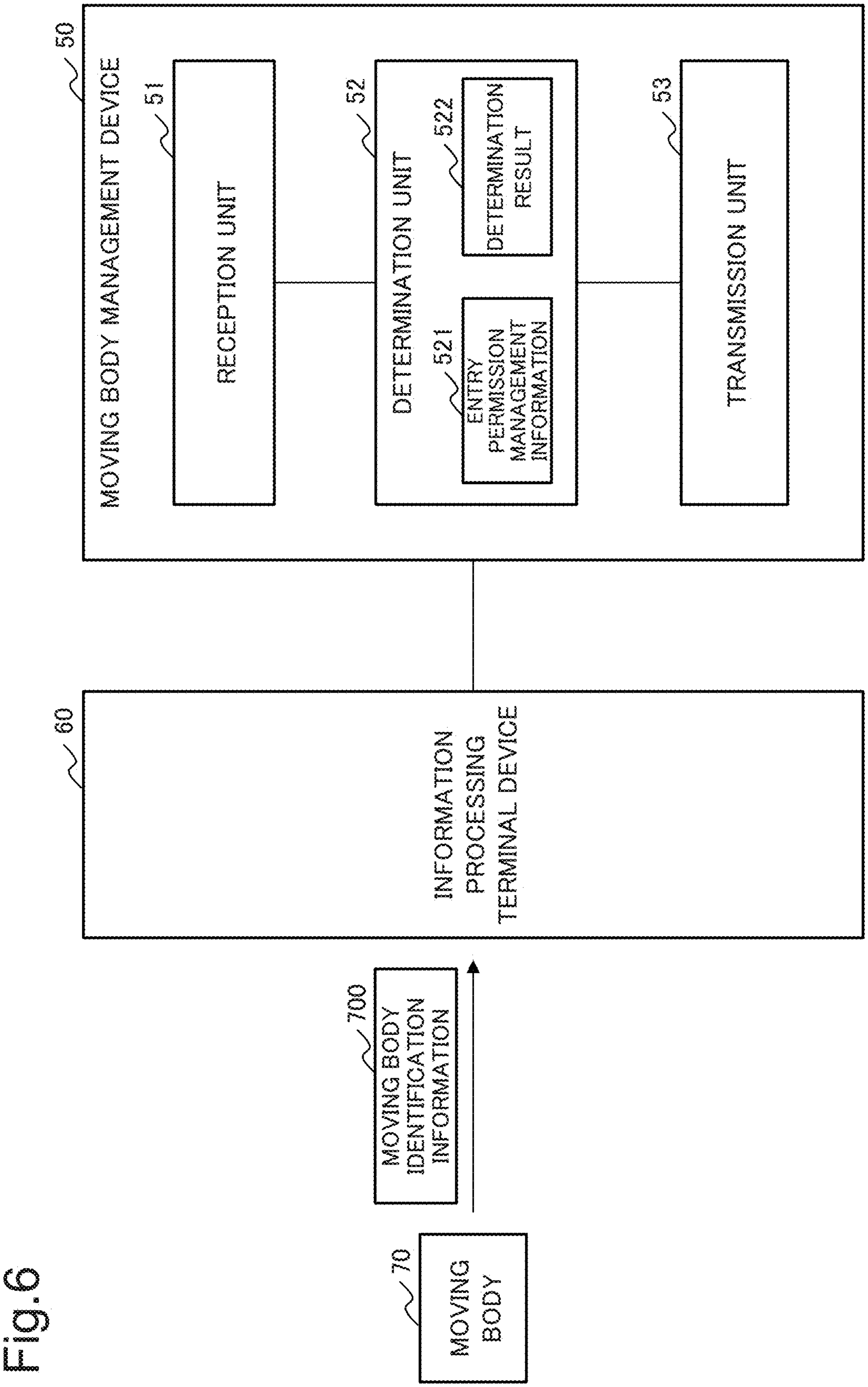
FIG. 6 is a block diagram illustrating a configuration of a moving body management device 50 according to a second example embodiment of the present invention.

FIG. 6 is a block diagram illustrating a configuration of a moving body management device 50 according to a second example embodiment of the present invention. The moving body management device 50 includes reception unit 51, determination unit 52, and transmission unit 53. However, the reception unit 51, the determination unit 52, and the transmission unit 53 are examples of a reception means, a determination means, and a transmission means in order.

The reception unit 51 receives the moving body identification information 700, which is transmitted from the moving body 70, with which the moving body 70 can be identified, and which indicates the state of the moving body 70, from the information processing terminal device 60 that has received the moving body identification information 700. The moving body 70 is, for example, a moving device such as the drone 40 according to the first example embodiment. The moving body identification information 700 is, for example, information similar to the remote ID 400 according to the first example embodiment. The information processing terminal device 60 is, for example, a device similar to the information processing terminal device 20 according to the first example embodiment. For example, the reception unit 51 operates similarly to the reception unit 11 of the drone management device 10 according to the first example embodiment.

The determination unit 52 collates the received moving body identification information 700 with the entry permission management information 521 indicating an area where entry of the moving body 70 is permitted or prohibited, thereby determining whether the moving body 70 has entered the area where entry is prohibited. The entry permission management information 521 is, for example, information similar to the entry permission management information 171 according to the first example embodiment. The determination result 522 is, for example, information similar to the determination result 172 according to the first example embodiment. For example, the determination unit 52 operates similarly to the determination unit 12 of the drone management device 10 according to the first example embodiment.

The transmission unit 53 transmits the determination result 522 by the determination unit 52 to the information processing terminal device 60 capable of displaying the determination result 522. For example, the transmission unit 53 operates similarly to the transmission unit 13 of the drone management device 10 according to the first example embodiment.

The moving body management device 50 according to the present example embodiment can accurately detect the moving body 70 that has illegally entered the monitoring target area. This is because the moving body management device 50 collates the moving body identification information 700 received from the information processing terminal device 60 with the entry permission management information 521 to determine whether the moving body 70 has entered the entry prohibited area, and transmits the determination result 522 to the information processing terminal device 60.

<Hardware configuration Example>

Each unit in the drone management device 10, the information processing terminal device 20, and the drone control device 30 illustrated in FIG. 1 or the moving body management device 50 illustrated in FIG. 6 in each of the example embodiments described above can be achieved by dedicated hardware (HW) (electronic circuit). In FIGS. 1 and 6, at least the following configuration can be regarded as a functional (processing) unit (software module) of a software program.

- reception units 11 and 51,
- determination units 12 and 52,
- transmission units 13 and 53,
- update unit 14,
- control information generation unit 15,
- control information transmission unit 16,
- storage control function in storage unit 17,
- identification information reception unit 21,
- identification information transmission unit 22,
- imaging control function of imaging unit 23,
- display control unit 24,
- image recognition unit 26,
- display control unit 31,
- authentication unit 33.

However, the division of each unit illustrated in these drawings is a configuration for convenience of description, and various configurations can be assumed at the time of implementation. An example of a hardware environment in this case will be described with reference to FIG. 7.

Figure 7:
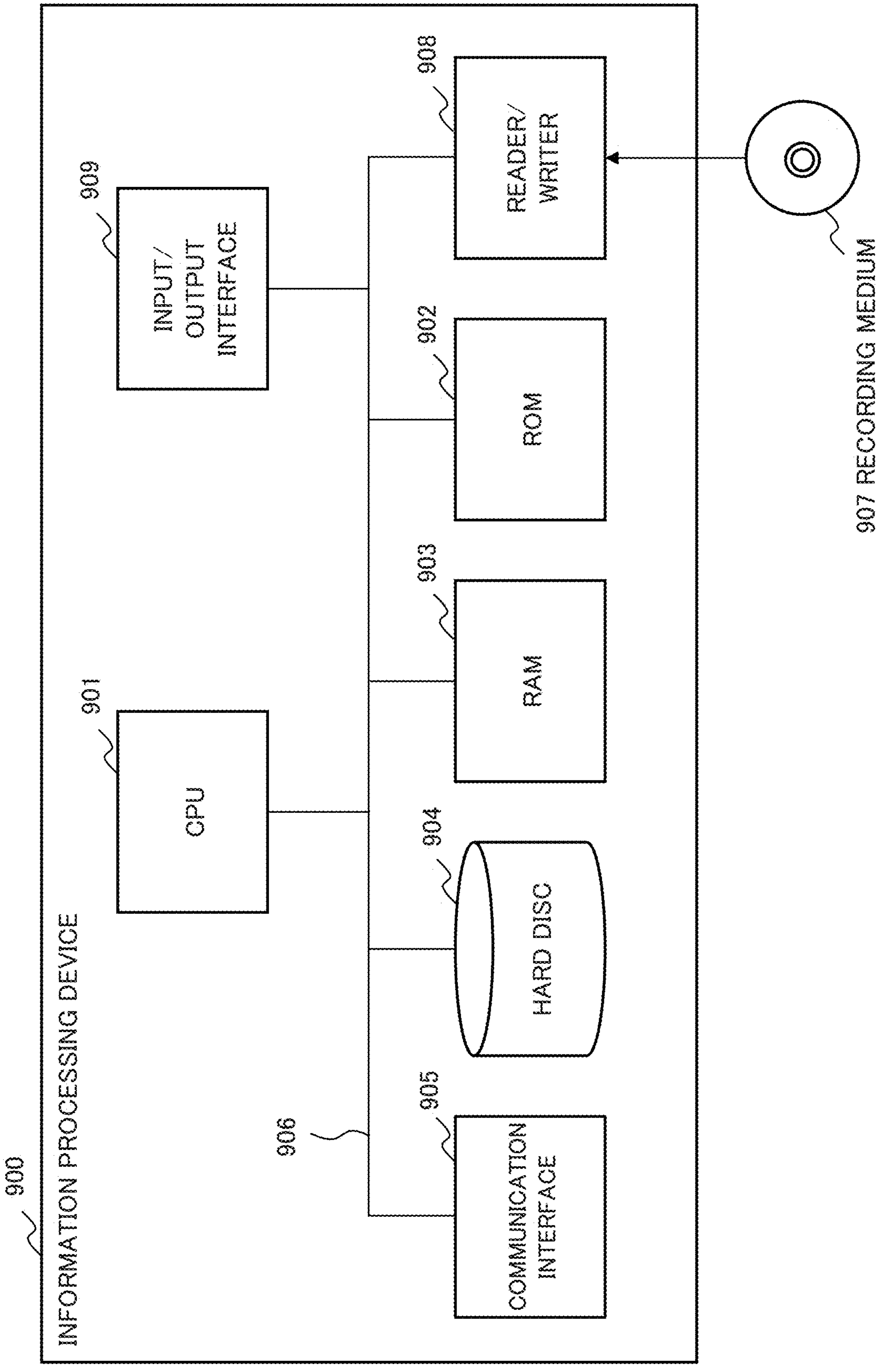
FIG. 7 is a block diagram illustrating a configuration of an information processing device 900 capable of achieving the drone management device 10, the information processing terminal device 20, the drone control device 30, and the moving body management device 50 according to each example embodiment of the present invention.

FIG. 7 is a diagram exemplarily describing a configuration of an information processing device 900 (computer system) capable of implementing the drone management device 10, the information processing terminal device 20, and the drone control device 30 according to the first example embodiment of the present invention, or the moving body management device 50 according to the second example embodiment. That is, FIG. 7 is a configuration of at least one computer (information processing device) capable of achieving each of the above-described devices illustrated in FIGS. 1 and 6, and represents a hardware environment capable of achieving each function in the above-described example embodiments.

The information processing device 900 illustrated in FIG. 7 includes the following as components, but may not include some of the following components.

- central processing unit (CPU) 901,
- read only memory (ROM) 902,
- random access memory (RAM) 903,
- hard disk (storage device) 904,
- communication interface 905 with external device,
- bus 906 (communication line),
- reader/writer 908 capable of reading/writing data stored in recording medium 907 such as compact disc read only memory (CD-ROM) or the like,
- input/output interface 909 such as monitor, speaker, or keyboard.

That is, the information processing device 900 including the above components is a general computer to which these components are connected via the bus 906. The information processing device 900 may include a plurality of CPUs 901 or may include a CPU 901 with multi-cores. The information processing device 900 may include a graphical processing unit (GPU) (not illustrated) in addition to the CPU 901.

Then, the present invention described using the above-described example embodiments as an example supplies a computer program capable of achieving the following functions to the information processing device 900 illustrated in FIG. 7. The function is the above-described configuration in the block configuration diagram (FIGS. 1 and 6) referred to in the description of the example embodiment or the function of the flowchart (FIGS. 4A and 4B and FIGS. 5A and 5B). Thereafter, the present invention is achieved by reading, interpreting, and executing the computer program on the CPU 901 of the hardware. The computer program supplied into the device may be stored in a readable/writable volatile memory (RAM 903) or a nonvolatile storage device such as the ROM 902 or the hard disk 904.

In the above case, a general procedure can be adopted at present as a method of supplying the computer program into the hardware. Examples of the procedure include, for example, a method of installing the program in the device via various recording media 907 such as a CD-ROM, a method of downloading the program from the outside via a communication line such as the Internet, and the like. In such a case, the present invention can be understood to be constituted by a code constituting the relevant computer program or the recording medium 907 storing the code.

The present invention has been described above using the above-described example embodiments as exemplary examples. However, the present invention is not limited to the above-described example embodiments. That is, the present invention can apply various aspects that can be understood by those skilled in the art within the scope of the present invention.

Some or all of the example embodiments described above can also be described as the following supplementary notes. However, the present invention exemplarily described by the example embodiments described above is not limited to the following.

(Supplementary Note 1)

A moving body management device including:

a reception means configured to receive moving body identification information from an information processing terminal device that has received the moving body identification information transmitted from a moving body, the moving body identification information being information with which the moving body can be identified and indicating a state of the moving body;

a determination means configured to determine whether the moving body has entered an area where entry is prohibited by collating the received moving body identification information with entry permission management information indicating an area where entry is permitted or prohibited with respect to the moving body; and a transmission means configured to transmit, to the information processing terminal device, a determination result from the determination means, the information processing terminal device being capable of displaying the determination result.

(Supplementary Note 2)

The moving body management device according to supplementary note 1, wherein the moving body identification information includes information indicating a position of the moving body and time.

(Supplementary Note 3)

The moving body management device according to supplementary note 1, further including an update means configured to update the entry permission management information such that the area to which the entry of the moving body is permitted increases as a payment amount of a user of the moving body increases.

(Supplementary Note 4)

The moving body management device according to supplementary note 1 or 2, further including:

a control information generation means configured to generate control information for controlling movement of the moving body in such a way that the moving body does not enter the area where entry of the moving body indicated by the entry permission management information is prohibited, from a state of the moving body indicated by the moving body identification information; and a control information transmission means configured to transmit the generated control information to a moving body control device configured to control movement of the moving body.

(Supplementary Note 5)

The moving body management device according to any one of supplementary notes 1 to 4, wherein the moving body is a drone, and the moving body identification information is a remote ID.

(Supplementary Note 6)

The information processing terminal device that transmits the moving body identification information to the moving body management device according to any one of supplementary notes 2 to 5, the information processing terminal device including:

a display control means configured to display at least one of a map on which the moving body identification information is displayed at a position of the moving body indicated by the received moving body identification information or an imaged image of the moving body in which the moving body identification information is superimposed on the moving body, together with the determination result on a display screen included in the information processing terminal device.

(Supplementary Note 7)

The information processing terminal device according to supplementary note 6, further including:

an image recognition means configured to recognize the moving body in the imaged image by performing image recognition process on the imaged image, wherein the display control means displays that the moving body is suspicious on the display screen when the display control means cannot receive the moving body identification information from the moving body recognized by the image recognition means.

(Supplementary Note 8)

The information processing terminal device according to supplementary note 6 or 7, wherein the display control means displays, on the display screen, a result of collation of the moving body identification information with moving body registration information indicating whether the moving body requires attention by the moving body management device.

(Supplementary Note 9)

The information processing terminal device according to any one of supplementary notes 6 to 8, wherein the entry permission management information indicates three-dimensional coordinates related to the area, and the display control means displays the area on the display screen in a three-dimensional display mode by superimposing the area on at least one of the map or the imaged image.

(Supplementary Note 10)

The information processing terminal device according to any one of supplementary notes 6 to 9, further including:

a geomagnetic sensor and a gravitational acceleration sensor, wherein the display control means corrects an orientation of the moving body with reference to the information processing terminal device indicated by the geomagnetic sensor using a gravitational acceleration vector indicated by the gravitational acceleration sensor when the imaged image of the moving body in which the moving body identification information is superimposed on the moving body is displayed on the display screen.

(Supplementary Note 11)

The moving body control device that receives the control information transmitted from the moving body management device according to supplementary note 4 and the moving body identification information transmitted from the moving body, and accepts an input operation made by a pilot of the moving body, the moving body control device including:

a display control means configured to display the entry permission management information on a display screen included in the moving body control device by superimposing the entry permission management information on at least one of a map on which the moving body identification information is displayed at a position of the moving body indicated by the received moving body identification information or an imaged image imaged by the moving body.

(Supplementary Note 12)

The moving body control device according to supplementary note 11, wherein the entry permission management information indicates three-dimensional coordinates related to the area, and the display control means displays the area on the display screen in a three-dimensional display mode by superimposing the area on at least one of the map or the imaged image.

(Supplementary Note 13)

The moving body control device according to supplementary note 11 or 12, further including an authentication means configured to perform authentication of a pilot by using authentication information in which the moving body identification information of the moving body to be controlled is associated with pre-registration information indicating the pilot.

(Supplementary Note 14)

A moving body management method by an information processing device including:

receiving moving body identification information from an information processing terminal device that has received the moving body identification information transmitted from a moving body, the moving body identification information being information with which the moving body can be identified and indicating a state of the moving body;

determining whether the moving body has entered an area where entry is prohibited by collating the received moving body identification information with entry permission management information indicating an area where entry is permitted or prohibited with respect to the moving body; and transmitting, to the information processing terminal device, a determination result on whether the moving body has entered an area where entry is prohibited, the information processing terminal device being capable of displaying the determination result.

(Supplementary Note 15)

A recording medium storing a moving body management program for causing a computer to execute:

a reception process of receiving moving body identification information from an information processing terminal device that has received the moving body identification information transmitted from a moving body, the moving body identification information being information with which the moving body can be identified and indicating a state of the moving body;

a determination process of determining whether the moving body has entered an area where entry is prohibited by collating the received moving body identification information with entry permission management information indicating an area where entry is permitted or prohibited with respect to the moving body; and a transmission process of transmitting, to the information processing terminal device, a determination result from the determination process, the information processing terminal device being capable of displaying the determination result.

REFERENCE SIGNS LIST

1 drone management system
10 drone management device
11 reception unit
12 determination unit
13 transmission unit
14 update unit
15 control information generation unit
16 control information transmission unit
17 storage unit
171 entry permission management information
172 determination result
173 control information
174 drone registration information
20 information processing terminal device
21 identification information reception unit
22 identification information transmission unit
23 imaging unit
24 display control unit
25 display screen
26 image recognition unit
30 drone control device
31 display control unit
32 display screen
33 authentication unit
40 drone
400 remote ID
50 moving body management device
51 reception unit
52 determination unit
521 entry permission management information
522 determination result
53 transmission unit
60 information processing terminal device
70 moving body
700 moving body identification information
900 information processing device
901 CPU
902 ROM

903 RAM
904 hard disk (storage device)
905 communication interface
906 bus
907 recording medium
908 reader/writer
909 input/output interface

What is claimed is:

1. A moving body management device comprising:

at least one first memory storing a first computer program; and at least one first processor configured to execute the first computer program to receive moving body identification information from an information processing terminal device that has received the moving body identification information transmitted from a moving body, the moving body identification information being information with which the moving body can be identified and indicating a state of the moving body;

determine whether the moving body has entered an area where entry is prohibited by collating the received moving body identification information with entry permission management information indicating an area where entry is permitted or prohibited with respect to the moving body;

transmit, to the information processing terminal device, a determination result of determining whether the moving body has entered the area, the information processing terminal device being capable of displaying the determination result;

generate control information for controlling a movement of the moving body so that the moving body does not enter the area into which entry of the moving body is prohibited, the area being indicated by the entry permission management information, based on the state of the moving body represented by the moving body identification information; and transmit the entry permission management information and the generated control information to a moving body control device that accepts an input operation by an operator who operates the moving body and controls the movement of the moving body in accordance with the input operation, wherein the entry permission management information is used in the moving body control device to display areas in which entry of the moving body is permitted or prohibited.

2. The moving body management device according to claim 1, wherein the moving body identification information includes information indicating a position of the moving body and a time.

3. The moving body management device according to claim 1, wherein the first processor is configured to execute the first computer program to update the entry permission management information such that the area to which the entry of the moving body is permitted increases as a payment amount of a user of the moving body increases.

4. The moving body management device according to claim 1, wherein the moving body is a drone, and the moving body identification information is a remote ID.

5. An information processing terminal device comprising:

a geomagnetic sensor and a gravitational acceleration sensor;

at least one second memory storing a second computer program; and at least one second processor configured to execute the second computer program to transmit a moving body identification information to a moving body management device, the moving body identification information being information with which a moving body can be identified and indicating a state of the moving body, the moving body identification information including information indicating a position of the moving body and a time;

display at least one of a map on which the moving body identification information is displayed at the position of the moving body indicated by the received moving body identification information or an imaged image of the moving body in which the moving body identification information is superimposed on the moving body, together with a determination result, on a display screen included in the information processing terminal device, of determining whether the moving body has entered the area; and correct an orientation of the moving body with reference to the information processing terminal device indicated by the geomagnetic sensor using a gravitational acceleration vector indicated by the gravitational acceleration sensor when the imaged image of the moving body in which the moving body identification information is superimposed on the moving body is displayed on the display screen, wherein the moving body management device comprises at least one first memory storing a first computer program, and at least one first processor configured to execute the first computer program to receive the moving body identification information from the information processing terminal device that has received the moving body identification information transmitted from the moving body, determine whether the moving body has entered an area where entry is prohibited by collating the received moving body identification information with entry permission management information indicating an area where entry is permitted or prohibited with respect to the moving body, transmit, to the information processing terminal device, the determination result of determining whether the moving body has entered the area, the information processing terminal device being capable of displaying the determination result.

6. The information processing terminal device according to claim 5, wherein the second processor is configured to execute the second computer program to:

recognize the moving body in the imaged image by performing image recognition process on the imaged image; and display that the moving body is suspicious on the display screen when it is not able to receive the moving body identification information from the recognized moving body.

7. The information processing terminal device according to claim 5, wherein the second processor is configured to execute the second computer program to display, on the display screen, a result of collation of the moving body identification information with moving body registration information indicating whether the moving body requires attention by the moving body management device.

8. The information processing terminal device according to claim 5, wherein the entry permission management information indicates three-dimensional coordinates related to the area, and the second processor is configured to execute the second computer program to display the area on the display screen in a three-dimensional display mode by superimposing the area on at least one of the map or the imaged image.

9. A moving body control device comprising:

at least one third memory storing a third computer program; and at least one third processor configured to execute the third computer program to receive control information transmitted from a moving body management device and a moving body identification information transmitted from a moving body, accept an input operation made by a pilot of the moving body, and display an entry permission management information on a display screen included in the moving body control device by superimposing the entry permission management information on at least one of a map on which the moving body identification information is displayed at a position of the moving body indicated by the received moving body identification information or an imaged image imaged by the moving body, wherein the moving body management device comprises at least one first memory storing a first computer program, and at least one first processor configured to execute the first computer program to receive the moving body identification information from an information processing terminal device that has received the moving body identification information transmitted from the moving body, determine whether the moving body has entered an area where entry is prohibited by collating the received the moving body identification information with the entry permission management information indicating an area where entry is permitted or prohibited with respect to the moving body, transmit, to the information processing terminal device, a determination result of determining whether the moving body has entered the area, the information processing terminal device being capable of displaying the determination result, generate control information for controlling a movement of the moving body in such a way that the moving body does not enter the area where entry of the moving body indicated by the entry permission management information is prohibited, from a state of the moving body indicated by the moving body identification information, and transmit the generated control information to the moving body control device.

10. The moving body control device according to claim 9, wherein the entry permission management information indicates three-dimensional coordinates related to the area, and the third processor is configured to execute the third computer program to display the area on the display screen in a three-dimensional display mode by superimposing the area on at least one of the map or the imaged image.

11. The moving body control device according to claim 9, wherein the third processor is configured to execute the third computer program to perform authentication of the pilot by using authentication information in which the moving body identification information of the moving body to be controlled is associated with pre-registration information indicating the pilot.

* * * * *